United States Patent
Son et al.

(10) Patent No.: US 8,758,926 B2
(45) Date of Patent: Jun. 24, 2014

(54) SEPARATOR FOR ELECTROCHEMICAL DEVICE, MANUFACTURING METHOD THEREOF, AND ELECTROCHEMICAL DEVICE COMPRISING THE SAME

(71) Applicant: LG Chem, Ltd., Seoul (KR)

(72) Inventors: Jeong-Man Son, Gyeongbuk (KR); Yoon-Jung Bae, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 13/623,173

(22) Filed: Sep. 20, 2012

(65) Prior Publication Data

US 2013/0029202 A1 Jan. 31, 2013

Related U.S. Application Data

(63) Continuation of application No. PCT/KR2011/002007, filed on Mar. 23, 2011.

(30) Foreign Application Priority Data

Mar. 23, 2010 (KR) .................. 10-2010-0025658
Mar. 23, 2011 (KR) .................. 10-2011-0026076

(51) Int. Cl.
*H01M 2/16* (2006.01)

(52) U.S. Cl.
USPC ........... 429/144; 429/145; 429/253; 429/254; 427/393.5; 428/523

(58) Field of Classification Search
USPC ............... 429/144, 145, 253, 254; 427/393.5; 428/523
See application file for complete search history.

(56) References Cited

U.S. PATENT DOCUMENTS

| | | | |
|---|---|---|---|
| 3,471,441 A | 10/1969 | Hindersinn et al. | |
| 3,953,236 A * | 4/1976 | Ito et al. ................. | 429/253 |
| 4,381,391 A | 4/1983 | Chen et al. | |
| 5,593,588 A | 1/1997 | Kim et al. | |
| 5,650,479 A | 7/1997 | Glugla et al. | |
| 2007/0178376 A1 | 8/2007 | Fujikawa et al. | |
| 2008/0070107 A1 | 3/2008 | Kasamatsu et al. | |
| 2013/0171501 A1* | 7/2013 | Son et al. ................. | 429/145 |

FOREIGN PATENT DOCUMENTS

| | | |
|---|---|---|
| JP | 2007169550 A | 7/2007 |
| KR | 10-0183370 B1 | 4/1999 |
| KR | 10-2009-0056811 A | 6/2009 |
| WO | 0175991 A1 | 10/2001 |
| WO | 2009069928 A2 | 6/2009 |

OTHER PUBLICATIONS

International Search Report for Application No. PCT/KR2011/002007 dated Oct. 17, 2011.

* cited by examiner

*Primary Examiner* — Zachary Best
(74) *Attorney, Agent, or Firm* — Lerner, David, Littenberg, Krumholz & Mentlik, LLP

(57) ABSTRACT

Provided is a separator for an electrochemical device including a plate-like porous substrate, and a porous thin-film coating layer formed on at least one surface of the plate-like porous substrate and containing crosslinked polyester. The crosslinked polyester coating layer hardly affects the air permeability of the separator. Also, the crosslinked polyester coating layer has good hydrophilicity and wettability to an electrolyte, and thus improves the performance of the battery. Also, the crosslinked polyester coating layer has excellent resistance to heat and deformation, and thus prevents the thermal shrinkage of the separator.

15 Claims, No Drawings

SEPARATOR FOR ELECTROCHEMICAL DEVICE, MANUFACTURING METHOD THEREOF, AND ELECTROCHEMICAL DEVICE COMPRISING THE SAME

CROSS-REFERENCE TO RELATED APPLICATION

This application is a continuation of International Application PCT/KR2011/002007 filed on Mar. 23, 2011, which claims priority from Korean Patent Application No. 10-2010-0025658, filed on Mar. 23, 2010 and Korean Patent Application No. 10-2011-0026076 filed on Mar. 23, 2011, the entire disclosure of which is incorporated herein by reference for all purposes.

BACKGROUND OF THE INVENTION

The present invention relates to a separator for an electrochemical device, a manufacturing method thereof, and an electrochemical device comprising the same.

Recently, there is an increasing interest in energy storage technologies. As the application fields of energy storage technologies have been extended to mobile phones, camcorders, notebook computers, and even electric cars, efforts towards the research and development on electrochemical devices have been increasing. In aspect of the above situation, rechargeable secondary batteries are at the center of attention as the most favorable electrochemical device. Lately, many studies have been done to design new electrodes and batteries to improve the capacity density and specific energy of the batteries.

Among currently available secondary batteries, lithium secondary batteries developed in the early 1990's have drawn attention for their higher operating voltage and much higher energy density than those of conventional batteries using an aqueous electrolyte such as Ni-MH batteries, Ni—Cd batteries, and $H_2SO_4$—Pb batteries. However, lithium secondary batteries have shortcomings such as a complicate manufacturing process and safety-related problems caused by the use of an organic electrolyte, for example, firing, explosion, and the like. Lithium-ion polymer batteries that have settled the drawbacks of lithium ion batteries are considered as one of the next-generation batteries. However, lithium-ion polymer batteries have a relatively lower battery capacity than lithium ion batteries, and in particular, have an insufficient discharging capacity at low temperature. Accordingly, there is an urgent need to solve these disadvantages of lithium-ion polymer batteries.

A variety of electrochemical devices are being produced from many different companies, and they all exhibit different safety characteristics. Thus, it is important to evaluate and ensure the safety of electrochemical devices. The most important factor to consider is that electrochemical devices should not cause any damage to users due to malfunction. Taking this into account, Safety Regulations strictly prohibit safety-related accidents of electrochemical devices such as firing or smoke emission. According to the safety characteristics of electrochemical devices, thermal runaway caused by overheating of an electrochemical device or puncture of a separator may increase the risk of explosion.

In particular, a polyolefin-based porous membrane conventionally used as a separator for an electrochemical device may show severe thermal shrinkage behaviors when the electrochemical device is subject to thermal runaway, thereby resulting in a short circuit between a cathode and an anode. Meanwhile, a conventional separator such as a polyolefin-based porous membrane has poor wettability to an electrolyte, which may have a negative influence on improving the performance of an electrochemical device.

Accordingly, there is a need for a separator with excellent heat resistance and wettability to an electrolyte.

Therefore, it is an object of the invention to provide a separator having improved heat resistance and wettability to an electrolyte that can replace a conventional separator, a manufacturing method thereof, and an electrochemical device comprising the same.

SUMMARY OF THE INVENTION

In an aspect of the present invention, there is provided a separator for an electrochemical device, including a plate-like porous substrate, and a porous thin-film coating layer formed on at least one surface of the plate-like porous substrate and containing crosslinked polyester.

In another aspect of the present invention, there is provided a method for manufacturing the above-mentioned separator, including preparing a first solution by dissolving a multifunctional phenol compound having at least two phenol groups and a metal salt base catalyst in water, preparing a second solution by dissolving a multifunctional acyl halide compound of an aromatic compound having at least two acyl halide groups in an organic solvent, and applying the first solution and the second solution on at least one surface of a plate-like porous substrate, followed by interfacial polymerization.

DETAILED DESCRIPTION

Hereinafter, the present invention will be described in detail. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

A separator for an electrochemical device according to the present invention may have a plate-like porous substrate. The plate-like porous substrate is not particularly limited if it is a conventional one used in an electrochemical device, and may be, for example, a porous membrane or non-woven fabric made from various polymers. Specially, a non-woven fabric made from polyethyleneteraphthalate fibers or a polyolefin-based porous membrane that is used in an electrochemical device, in particular, as a separator for an electrochemical device, may be used. In this instance, its material or shape may be variously selected depending on the purpose. For example, the polyolefin-based porous membrane may be formed from polyolefin-based polymers including polyethylene such as high-density polyethylene, linear low-density polyethylene, low-density polyethylene or ultra-high-molecular-weight polyethylene, polypropylene, polybutylene, and polypentene, singularly or in combination. Also, the non-woven fabric may be made from fibers using polyolefin-based polymers or polymers having higher heat resistance than those of polyolefin-based polymers. The plate-like porous substrate may be monolayered, or if necessary, multilayered, for example, in the structure of polypropylene/polyethylene or polypropylene/polyethylene/polypropylene.

The thickness of the plate-like porous substrate is not particularly limited, however is preferably 1 to 100 µm, more preferably 5 to 50 µm. Also, the pore size and porosity of the porous substrate are not particularly limited, however are preferably 0.01 to 50 μm and 10 to 95%, respectively.

The separator for an electrochemical device according to the present invention may have a porous thin-film coating layer containing crosslinked polyester formed on the plate-like porous substrate, and the porous thin-film coating layer containing crosslinked polyester may be formed on one surface or both surfaces of the plate-like porous substrate.

The crosslinked polyester constituting the porous thin-film coating layer according to the present invention has ester bonds in the molecule. The ester bonds have excellent stability and affinity for an electrolyte. The crosslinked polyester is particularly excellent in the resistance to heat and deformation. Accordingly, the separator having the porous thin-film coating layer containing crosslinked polyester may have excellent affinity for an electrolyte and wettability to an electrolyte, and thus, may contribute to improving the performance of a battery. As mentioned above, the porous thin-film coating layer containing crosslinked polyester also has excellent resistance to heat and deformation, and thus, may prevent the thermal shrinkage of a separator.

The porous thin-film coating layer containing crosslinked polyester has a very small thickness and a high porosity so as not to influence the air permeability of the plate-like porous substrate, and so the entire separator has excellent air permeability. In this instance, for excellent air permeability, the porous thin-film coating layer containing crosslinked polyester may preferably have a thickness of 0.1 to 1 μm.

The crosslinked polyester may be formed by polymerization of a multifunctional phenol compound having at least two phenol groups with a multifunctional acyl halide compound of an aromatic compound having at least two acyl halide groups, specifically a condensation polymerization of a plurality of phenol groups with a plurality of acyl halide groups.

Preferably, the multifunctional phenol compound of the present invention may include 4,4-dihydroxybiphenol, 2,2-biphenol, bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 1,1-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl)phenylmethane, 4,4-dihydroxyphenyl-1,1-m-diisopropylbenzene, 4,4-dihydroxyphenyl-9,9-fluorene, 2,2-bis(4-hydroxyphenyl)hexafluoropropane, 4,4-sulfonyldiphenol, 4,4-dihydroxybenzophenone, 4,4-isopropylidenebis-(2,6-dibromophenol), 4,4-isopropylidenebis-(2,6-dimethylphenol), 4,4-hexafluoroisopropylidenebis-(2,6-dichlorophenol), and 1,1,1-tris(4-hydroxyphenyl)ethane.

The multifunctional acyl halide compound may include trimezoyl chloride, isophthaloyl chloride, and terephthaloyl chloride.

The separator of the present invention may be, for example, manufactured by forming a porous thin-film coating layer containing crosslinked polyimide prepared using an interfacial polymerization of a multifunctional phenol compound with a multifunctional acyl halide compound, and its specific method is as follows.

First, a multifunctional phenol compound having at least two phenol groups and a metal salt base catalyst may be dissolved in water to prepare a first solution, and a multifunctional acyl halide compound of an aromatic compound having at least two acyl halide groups may be dissolved in an organic solvent to prepare a second solution. Particularly, the first solution may be prepared by dissolving a multifunctional phenol compound in an aqueous solution containing 0.1 to 10 equivalent weights of a metal salt base catalyst, preferably 0.2 to 4 equivalent weights of a metal salt base catalyst per alcohol group of the multifunctional phenol compound, followed by reaction at room temperature or at 80° C. for 1 hour or more.

The interfacial polymerization is a type of polymerization in which reagents are dissolved separately in two immiscible liquid phases to obtain polymers. In the present invention, to form polyester, a first solution, that is aqueous, obtained by dissolving a multifunctional phenol compound having at least two phenol groups and a metal salt base catalyst in water, and a second solution, that is non-polar, obtained by dissolving an aromatic acyl halide compound having at least two acyl halide groups in an organic solvent may be prepared.

The multifunctional phenol compound in the first solution may preferably include 4,4-dihydroxybiphenol, 2,2-biphenol, bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 1,1-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl)phenylmethane, 4,4-dihydroxyphenyl-1,1-m-diisopropylbenzene, 4,4-dihydroxyphenyl-9,9-fluorene, 2,2-bis(4-hydroxyphenyl)hexafluoropropane, 4,4-sulfonyldiphenol, 4,4-dihydroxybenzophenone, 4,4-isopropylidenebis-(2,6-dibromophenol), 4,4-isopropylidenebis-(2,6-dimethylphenol), 4,4-hexafluoroisopropylidenebis-(2,6-dichlorophenol), and 1,1,1-tris(4-hydroxyphenyl)ethane.

The metal salt base catalyst may be a base containing a general monovalent alkali metal, and may include, but is not limited to, sodium hydroxide (NaOH), potassium hydroxide (KOH), sodium carbonate ($Na_2CO_3$), and potassium carbonate ($K_2CO_3$).

The multifunctional acyl halide compound in the second solution may preferably include trimezoyl chloride, isophthaloyl chloride, and terephthaloyl chloride. Also, the organic solvent of the second solution may include hexane, cyclohexane, heptane, $C_8$ to $C_{12}$ alkanes, dichlorodifluoromethane, trichlorofluoromethane, chlorodifluoromethane, dichlorotetrafluoroethane, and trichlorotrifluoroethane.

Subsequently, the first and second solutions may be respectively coated on at least one surface of the plate-like porous substrate, followed by interfacial polymerization, to form a porous thin-film coating layer containing crosslinked polyester.

Preferably, the first solution, that is aqueous, may be coated on the plate-like porous substrate using a conventional liquid coating technique such as roll coating, bar coating, spray coating or dipping, and the second solution, that is non-polar, may be then coated thereon. In this instance, the steps may be reversed so that the second solution may be coated first and then the first solution may be coated. The solutions may be coated on one surface or both surfaces of the plate-like porous substrate. To minimize the conversion of the acyl halide compound of the second solution into carboxylic acid by the reaction with water, it is preferred to squeeze the porous substrate coated with the first solution before coating with the second solution so as to adjust the thickness of the first solution.

A polyester thin-film coating layer may be formed by polymerization at the interface between the first solution and the second solution at room temperature. In this instance, crosslinked polyester may be formed by condensation polymerization between a plurality of phenol groups and a plurality of acyl halide groups by using the multifunctional phenol compound and the multifunctional acyl halide compound.

A post-treatment process including washing and drying may be performed on the porous thin-film coating layer containing crosslinked polyester, to manufacture a separator. Preferably, the porous thin-film coating layer has a thickness of 0.1 to 1 μm. By controlling the concentration of the first and second solutions or the interfacial polymerization time, the porous thin-film coating layer may have a desired thickness. Alternatively, depending on the need, the above process may repeat to form a multilayered thin-film coating layer.

The separator of the present invention may be interposed between a cathode and an anode to fabricate an electrochemical device. In this instance, when a gellable polymer is used as a binder polymer component, the polymer used may form a gel by the reaction with an electrolyte injected after the battery assembly using the separator.

The electrochemical device of the present invention may include all devices in which an electrochemical reaction may occur, for example, all kinds of primary batteries, secondary batteries, fuel cells, solar cells, or capacitors including supercapacitors. In particular, among secondary batteries, lithium secondary batteries including lithium metal secondary batteries, lithium ion secondary batteries, lithium polymer secondary batteries or lithium ion polymer secondary batteries are preferred.

The electrode to be used with the separator of the present invention is not particularly limited, and may be manufactured by binding an electrode active material to a current collector using conventional methods known in the art. In the electrode active material, a cathode active material may include, but is not limited to, typical cathode active materials that are usable for a cathode of a conventional electrochemical device, and particularly, lithium manganese oxides, lithium cobalt oxides, lithium nickel oxides, lithium iron oxides or lithium composite oxides thereof are preferred. Also, an anode active material may include, but is not limited to, typical anode active materials that are usable for an anode of a conventional electrochemical device, and particularly, lithium intercalation materials such as lithium metals, lithium alloys, carbon, petroleum coke, activated carbon, graphite, or other carbonaceous materials are preferred. A cathode current collector may be formed of, for example, a foil made from aluminum, nickel or combinations thereof, and an anode current collector may be formed of, for example, a foil made from copper, gold, nickel, copper alloys or combinations thereof. However, the present invention is not limited in this regard.

The electrolyte usable in the present invention may contain a salt having the structure of $A^+B^-$, wherein $A^+$ represents an alkali metal cation selected from the group consisting of $Li^+$, $Na^+$ and $K^+$, or combinations thereof, and $B^-$ represents an anion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, and $C(CF_2SO_2)_3^-$, or combinations thereof, the salt being dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), and gamma-butyrolactone (γ-butyrolactone), or mixtures thereof. However, the present invention is not limited in this regard.

The electrolyte may be injected in a suitable step during fabrication of a battery, depending on the fabrication process and the desired properties of a final product. In other words, the electrolyte may be injected before the battery assembly or at the end of the battery assembly.

The separator of the present invention may be interposed between a cathode and an anode in a secondary battery, or in the case of an electrode assembly composed of a plurality of cells or electrodes, may be interposed between adjacent cells or electrodes. The electrode assembly may have various structures of, for example, stack-type, jelly roll-type, stack/folding-type, and the like.

According to an embodiment, the electrode assembly may be manufactured by placing the separator of the present invention between a cathode and an anode, each coated with an active material, and then winding the cathode, the separator, and the anode in a continuous manner. Alternatively, the electrode assembly may be manufactured by bending the cathode, the separator, and the anode in a zigzag fashion at regular intervals. In the electrode assembly manufactured by winding or bending, a plurality of electrodes and a plurality of separators may be alternately stacked for capacity improvement.

According to another embodiment, the electrode assembly may be manufactured by stacking cathode/separator/anode or anode/separator/cathode as a repeat unit. Here, the separator used may be the separator of the present invention.

According to an embodiment, the electrode assembly may be manufactured by assembling a plurality of unit cells having a full cell or bi-cell structure on a folding film. Here, the folding film may be a typical insulated film or the separator of the present invention. The full cell structure may have at least one cell comprising electrodes having opposite polarity and a separator interposed therebetween, in which the outmost electrodes have opposite polarity. As an example of the full cell structure, a cathode/separator/anode or a cathode/separator/anode/separator/cathode/separator/anode may be mentioned. The bi-cell structure may have at least one cell comprising electrodes having opposite polarity and a separator interposed therebetween, in which the outmost electrodes have the same polarity. As an example of the bi-cell structure, a cathode/separator/anode/separator/cathode or an anode/separator/cathode/separator/anode may be mentioned.

Assembling of unit cells using a folding film may be made in various ways. For example, a plurality of unit cells may be arranged at a predetermined interval on one surface of a folding film extending in a lengthwise direction, and the arranged unit cells and the folding film may be wound in one direction. The resulting electrode assembly may be such that the unit cells are inserted in the wound folding film. Alternatively, a plurality of unit cells may be arranged at a predetermined interval on both surfaces of a folding film extending in a lengthwise direction, and the arranged unit cells and the folding film may be wound in one direction. The resulting electrode assembly may be such that the unit cells are inserted in the wound folding film. The intervals between the unit cells and the polarity of the outmost electrode in each of the unit cells may be selected such that an electrode located on and in contact with the folding film and an electrode located under and in contact with the folding film are opposite in polarity. For example, the intervals between the unit cells and the polarity of the outmost electrode in each of the unit cells may be selected such that the electrode assembly has the structure of cathode/separator/anode/folding film/cathode/separator/anode/folding film/cathode.

Alternatively, a plurality of unit cells may be arranged at a predetermined interval on one surface of a folding film extending in a lengthwise direction, and the arranged unit cells and the folding film may be bent in a zigzag fashion. The resulting electrode assembly may be such that the unit cells are inserted in the bent and stacked folding film. Alternatively, a plurality of unit cells may be arranged at a predetermined interval on both surfaces of a folding film extending in a lengthwise direction, and the arranged unit cells and the folding film may be bent in a zigzag fashion. The resulting electrode assembly may be such that the unit cells are inserted in the bent and stacked folding film. In this instance, the intervals between the unit cells and the polarity of the outmost electrode in each of the unit cells may be selected such that an electrode located on and in contact with the folding film and an electrode located under and in contact with the folding film are opposite in polarity. For example, the intervals between the unit cells and the polarity of the outmost electrode in each of the unit cells may be selected such that the electrode assembly has the structure of cathode/separator/anode/folding film/cathode/separator/anode/folding film/cathode.

Assembling of electrodes using a folding film may be also made in various ways. For example, electrodes may be arranged on one surface of a folding film in an alternate order of, for example, an anode, a cathode, an anode, a cathode, and the arranged electrodes and the folding film may be wound in one direction. The resulting electrode assembly may be such that the electrodes are inserted in the wound folding film. Alternatively, a plurality of electrodes may be arranged at a predetermined interval on both surfaces of a folding film extending in a lengthwise direction, and the arranged electrodes and the folding film may be wound in one direction. The resulting electrode assembly may be such that the electrodes are inserted in the wound folding film. In this instance, the intervals and the polarity of the electrodes may be selected such that an electrode located on and in contact with the folding film and an electrode located under and in contact with the folding film are opposite in polarity. For example, the intervals and the polarity of the electrodes may be selected to manufacture an electrode assembly of cathode/folding film/anode/folding film/cathode.

Alternatively, electrodes may be arranged on one surface of a folding film in an alternate order of, for example, an anode, a cathode, an anode, a cathode, and the arranged electrodes and the folding film may be wound in one direction. The resulting electrode assembly may be such that the electrodes are inserted in the wound folding film. Alternatively, a plurality of electrodes may be arranged at a predetermined interval on both surfaces of a folding film extending in a lengthwise direction, and the arranged electrodes and the folding film may be bent. The resulting electrode assembly may be such that the electrodes are inserted in the bent and stacked folding film. In this instance, the intervals and the polarity of the electrodes may be selected such that an electrode located on and in contact with the folding film and an electrode located under and in contact with the folding film are opposite in polarity. For example, the intervals and the polarity of the electrodes may be selected to manufacture an electrode assembly of cathode/folding film/anode/folding film/cathode.

Meanwhile, the length of the folding film used in manufacturing the electrode assembly may be selected such that the folding film can surround the electrode assembly at least once after the last cell or electrode is placed in the above manner. However, the electrode assembly is not limited in this regard, and may be modified in various types.

Hereinafter, the preferred embodiments of the present invention are described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

EXAMPLE

Comparative Example 1

Triple-layered Separator for a Lithium Ion Battery

A triple-layered separator for a lithium secondary battery composed of PP (polypropylene)/PE (polyethylene)/PP (polypropylene) was prepared. The separator had a thickness of 25 μm and a porosity of 40%.

Example 1

Polyester-coated Triple-layered Separator for a Lithium Ion Battery

A solution of 2 w % of 4,4-dihydroxybiphenol in an aqueous sodium hydroxide solution having a pH of 10, and a solution of isoparaffin and 0.2 w % of trimezoyl chloride were prepared.

Next, the triple-layered separator of comparative example 1 was dipped in the solution of 2 w % of 4,4-dihydroxybiphenol for 3 minutes, and the remaining water was then removed by means of rollers. The treated triple-layered separator was dipped in the solution of isoparaffin and 2 w % of trimezoyl chloride at room temperature for 1 minute.

The triple-layered separator having a polyester coating layer was dried in the air for 2 minutes, washed with water, and dried in an oven of 70° C. for 1 hour. The measured thickness of the polyester coating layer was 0.3 μm.

Example 2

Polyester-coated Triple Separator for a Lithium Ion Battery

A polyester-coated triple-layered separator for a lithium ion battery was manufactured in the same way as example 1, except that 4,4-dihydroxybiphenol was replaced by 2,2-bis (4-hydroxyphenyl)propane. The measured thickness of the resulting polyester coating layer was 0.3 μm.

Test Example 1

Measurement of Air Permeability

The comparative example 1 and examples 1 and 2 were measured for air permeability, and the results are shown in Table 1 below.

TABLE 1

|  | Air permeability (sec/100 ml) |
| --- | --- |
| Comparative example 1 | 450 |
| Example 1 | 440 |
| Example 2 | 450 |

As shown in the above Table 1, it is found that because air permeabilities of comparative example 1 and examples 1 and 2 are nearly equal to each other, the crosslinked polyester coating layer of the present invention hardly affects the air permeability.

Test Example 2

Measurement of Thermal Shrinkage

The comparative example 1 and examples 1 and 2 were heated in an oven of 170° C. for 1 hour, and measured for their area before and after heating to calculate their thermal shrinkage. The results are shown in Table 2 below.

TABLE 2

|  | Thermal shrinkage (%) |
|---|---|
| Comparative example 1 | 48 |
| Example 1 | 37 |
| Example 2 | 37 |

As shown in the above Table 2, it is found that because the thermal shrinkage of examples 1 and 2 is superior to that of comparative example 1, the crosslinked polyester coating layer of the present invention has excellent thermal stability.

According to teachings above, the crosslinked polyester thin-film coating layer formed on the porous substrate has a very small thickness and a high porosity, and thus, hardly affects the air permeability of the separator. Also, the crosslinked polyester thin-film coating layer has good hydrophilicity and wettability to an electrolyte as intrinsic characteristics of ester, and thus may improve the performance of the electrochemical device. Also, the crosslinked polyester thin-film coating layer has excellent resistance to heat and deformation, and thus, may prevent the thermal shrinkage of the separator.

What is claimed is:

1. A separator for an electrochemical device, comprising:
    a plate shaped porous substrate; and
    a porous thin-film coating layer formed on at least one surface of the plate shaped porous substrate, and consisting of a crosslinked polyester,
    wherein the plate shaped porous substrate is a polyolefin-based porous membrane, and
    the crosslinked polyester is formed by polymerization of a multifunctional phenol compound having at least two phenol groups with a multifunctional acyl halide compound of an aromatic compound having at least two acyl halide groups.

2. The separator for an electrochemical device according to claim 1,
    wherein the porous thin-film coating layer has a thickness of 0.1 µm to 1 µm.

3. The separator for an electrochemical device according to claim 1,
    wherein the multifunctional phenol compound is any one compound selected from 4,4-dihydroxybiphenol, 2,2-biphenol, bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 1,1-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl)phenylmethane, 4,4-dihydroxyphenyl-1,1-m-diisopropylbenzene, 4,4-dihydroxyphenyl-9,9-fluorene, 2,2-bis(4-hydroxyphenyl)hexafluoropropane, 4,4-sufonyldiphenol, 4,4-dihydroxybenzophenone, 4,4-isopropylidenebis-(2,6-dibromophenol), 4,4-isopropylidenebis-(2,6-dimethylphenol), 4,4-hexafluoroisopropylidenebis-(2,6-dichlorophenol) and 1,1,1-tris(4-hydroxyphenyl)ethane, or mixtures thereof.

4. The separator for an electrochemical device according to claim 1,
    wherein the multifunctional acyl halide compound is any one aromatic acyl halide selected from trimezoyl chloride, isophthaloyl chloride, and terephthaloyl chloride, or mixtures thereof.

5. The separator for an electrochemical device according to claim 1,
    wherein the polyolefin-based porous membrane is formed from any one polymer selected from the group consisting of polyethylene, polypropylene, polybutylene and polypentene.

6. The separator for an electrochemical device according to claim 1,
    wherein the plate shaped porous substrate has a thickness of 5 µm to 50 µm, a pore size of 0.01 µm to 50 µm, and a porosity of 10% to 95%.

7. A method for manufacturing a separator for an electrochemical device defined in claim 1, the method comprising:
    preparing a first solution by dissolving a multifunctional phenol compound having at least two phenol groups and a metal salt base catalyst in water;
    preparing a second solution by dissolving a multifunctional acyl halide compound of an aromatic compound having at least two acyl halide groups in an organic solvent; and
    applying the first solution and the second solution on at least one surface of a plate shaped porous substrate, followed by interfacial polymerization.

8. The method for manufacturing a separator for an electrochemical device according to claim 7,
    wherein the multifunctional phenol compound is any one compound selected from 4,4-dihydroxybiphenol, 2,2-biphenol, bis(4-hydroxyphenyl)methane, 2,2-bis(4-hydroxyphenyl)propane, 1,1-bis(4-hydroxyphenyl)ethane, 2,2-bis(4-hydroxy-3-methylphenyl)propane, 1,1-bis(4-hydroxyphenyl)heptane, 2,2-bis(4-hydroxy-3,5-dichlorophenyl)propane, 2,2-bis(4-hydroxy-2,5-dibromophenyl)propane, bis(4-hydroxyphenyl)phenylmethane, 4,4-dihydroxyphenyl-1,1-m-diisopropylbenzene, 4,4-dihydroxyphenyl-9,9-fluorene, 2,2-bis(4-hydroxyphenyl)hexafluoropropane, 4,4-sufonyldiphenol, 4,4-dihydroxybenzophenone, 4,4-isopropylidenebis-(2,6-dibromophenol), 4,4-isopropylidenebis-(2,6-dimethylphenol), 4,4-hexafluoroisopropylidenebis-(2,6-dichlorophenol) and 1,1,1-tris(4-hydroxyphenyl)ethane, or mixtures thereof.

9. The method for manufacturing a separator for an electrochemical device according to claim 7,
    wherein the metal salt base catalyst is any one catalyst selected from the group consisting of sodium hydroxide (NaOH), potassium hydroxide (KOH), sodium carbonate ($Na_2CO_3$) and potassium carbonate ($K_2CO_3$), or mixtures thereof.

10. The method for manufacturing a separator for an electrochemical device according to claim 7,
    wherein the multifunctional acyl halide compound is any one aromatic acyl halide selected from trimezoyl chloride, isophthaloyl chloride, and terephthaloyl chloride, or mixtures thereof.

11. The method for manufacturing a separator for an electrochemical device according to claim 7,
    wherein the organic solvent is any one compound selected from hexane, cyclohexane, heptane, C8 to C12 alkanes, dichlorodifluoromethane, trichlorofluoromethane, chlorodifluoromethane, dichlorotetrafluoroethane and trichlorotrifluoroethane, or mixtures thereof.

12. The method for manufacturing a separator for an electrochemical device according to claim 7,
   wherein the plate shaped porous substrate is a polyolefin-based porous membrane.

13. The method for manufacturing a separator for an electrochemical device according to claim 7,
   wherein the polyolefin-based porous membrane is formed from any one polymer selected from the group consisting of polyethylene, polypropylene, polybutylene and polypentene.

14. An electrochemical device, comprising:
   a cathode;
   an anode; and
   a separator interposed between the cathode and the anode, wherein the separator is defined in claim 1.

15. The electrochemical device according to claim 14, wherein the electrochemical device is a lithium secondary battery.

* * * * *